June 24, 1930.  J. E. BITTNER  1,765,751
HYDRAULIC CHANGE SPEED TRANSMISSION
Filed July 11, 1927  2 Sheets-Sheet 2
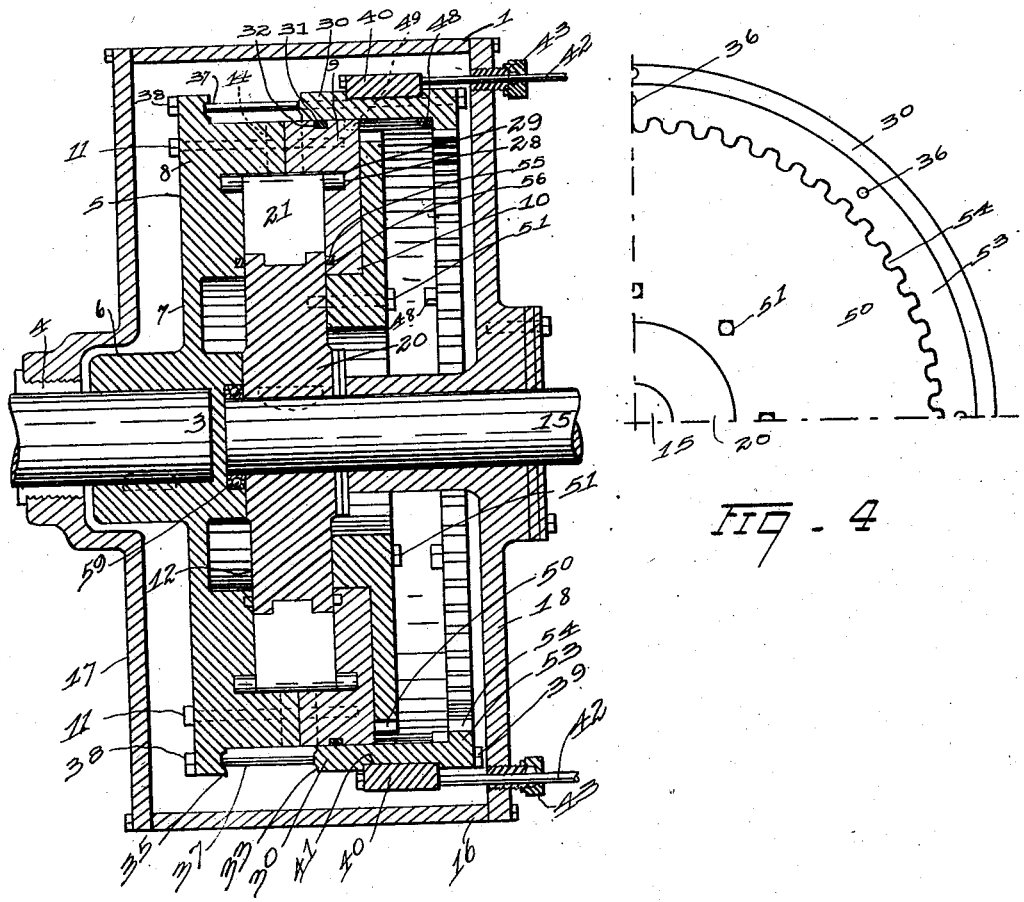
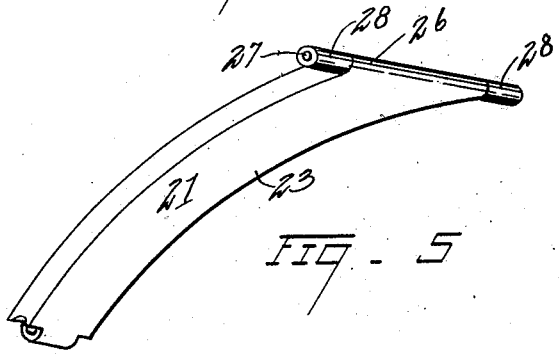
INVENTOR
Joseph E. Bittner
BY
ATTORNEY Patented June 24, 1930

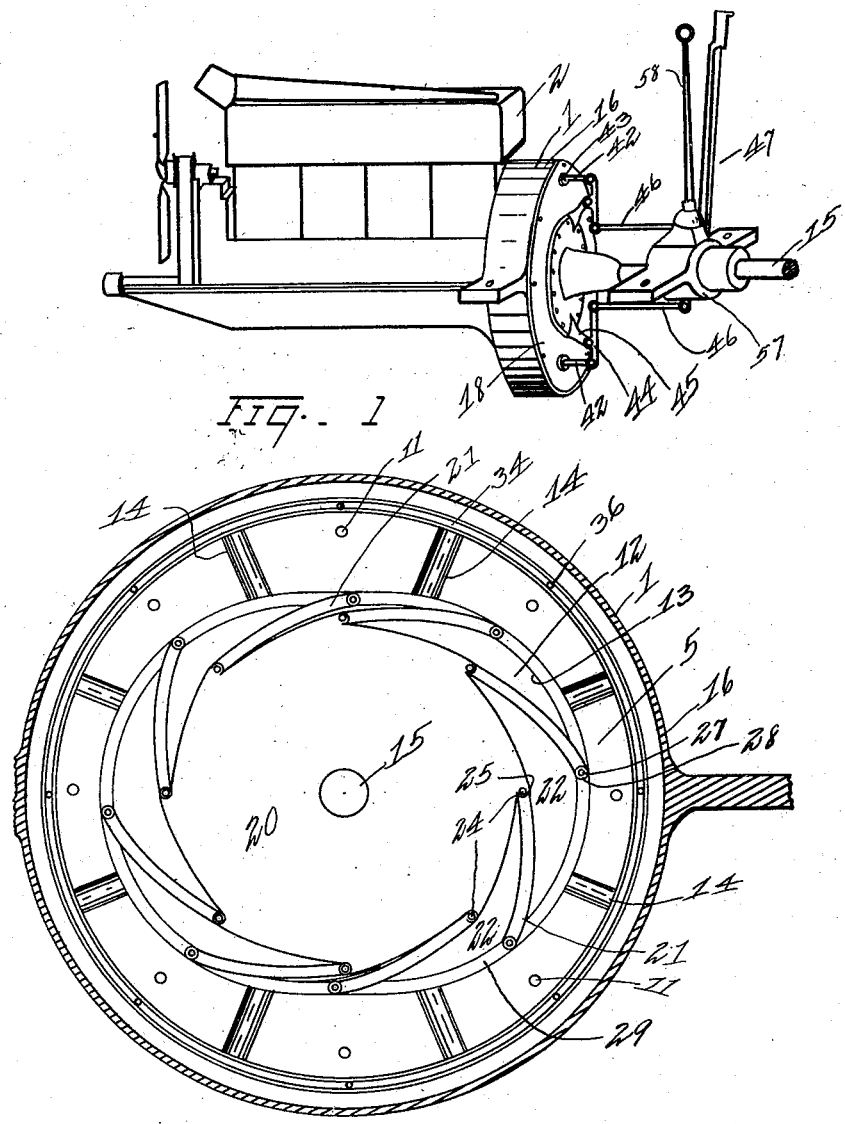

1,765,751

UNITED STATES PATENT OFFICE

JOSEPH E. BITTNER, OF YAKIMA, WASHINGTON

HYDRAULIC CHANGE-SPEED TRANSMISSION

Application filed July 11, 1927. Serial No. 204,725.

This invention relates to improvements in hydraulic change speed transmissions or variable hydraulic clutches.

It is an object of the invention to provide a transmission of this type which cooperates with a rotary member of a prime mover for effecting circulation of a fluid medium. This fluid serves also as a driving agent of another rotary member, and it is, therefore, an object of the invention to vary the volume of the fluid in circulation relatively to the volume of the fluid acting as a driving agent to produce more or less slippage of the second rotary member relatively to the first of these members, whereby, for instance, upon entirely preventing circulation of the fluid medium, the second rotary member will be driven at the speed of the first rotary member.

It is also an object of the invention to provide a change speed transmission of this type which will operate in the fluid member direct and which will, therefore, be noiseless and smooth in operation, and which will permit of a gradual progressive change of speed of two members relatively to each other.

With these and numerous other objects in view, an embodiment of the invention is illustrated in the accompanying drawings and is described in the following specification.

In the drawings:

Fig. 1 is a perspective view of the variable speed transmission in association with an engine and control device;

Fig. 2 is a transverse sectional view of the case and showing the assembly of the rotary members and fluid reservoirs;

Fig. 3 is an axial sectional view through the assembly of the rotary members;

Fig. 4 is a fragmentary side elevation of the rotary member and control lock, and Fig. 5 is a perspective view of one of the valve members forming part of the invention.

While in Fig. 1 the change speed transmission of the present invention is shown in association with an automobile engine, it is obvious that it lends itself to a combination with other types of prime movers,—whether stationary or transportable.

A casing 1 is bolted or in some other way secured to the engine 2, and the crank shaft 3 extends into said casing through a stuffing box 4 which is shown diagrammatically only. To the engine shaft 3 is secured in the interior of a casing a rotary member 5 which may serve as a flywheel structure for the engine.

This flywheel is advisably assembled of several parts, such as a hub 6, a disc or web 7 and a rim 8 to which parts are joined another rim 9 and an opposite web 10. The two rims are held assembled by screws 11 or the like, in such manner that within the interior of the flywheel structure 5 a space or reservoir 12 is formed.

This reservoir is centrally positioned in the rim of the fly wheel and hence does not destroy its symmetry with respect to the major and minor axes of the space within as pairs of its diametrally opposite points have equal volume, as may be seen in Figs. 2 and 3, and this reservoir has an outer non-circular wall 13 shown as an oval wall, and lateral walls formed by the webs 7 and 10 of the flywheel. Owing to the axial thickness of the flywheel structure, namely the space between the webs 7 and 10, the axial dimension of the reservoir 12 is relatively large,—at least suitable to receive another rotary member mounted concentrically and movable relatively to the flywheel structure within said reservoir.

A plurality of ports 14 extend in radial direction through the rim of the flywheel structure 5 and communicate at their inner ends with the reservoir 12 formed in the interior of this flywheel. Of the two main portions of this flywheel which are held assembled by the screws 11, one only is secured to the shaft 3, while the other flywheel portion may loosely surround another rotary shaft 15 in axial alinement with the first named shaft 3, this second portion being driven by the first portion of the flywheel structure thru the screws 11 by means of which these two portions are held in assembled relation.

The casing 1 surrounding the flywheel 5 also may be formed of a circumferential wall 16 and two end plates 17, 18, each of which is provided with means for rotatably supporting the shafts 3 and 15 respectively, and with means for preventing leakage of the fluid medium within the outer reservoir formed by the casing.

Intermediate the two portions of the flywheel structure there is fixedly mounted on the shaft 15 a core or driven rotary member 20 which may be of substantially circular cross-section. Hence the distance of the circumferential surface portion of this rotary member 20 from the non-circular wall 13 of the flywheel reservoir is different at different points, but equal at pairs of diametrally opposite points, i. e. non-uniform circumferentially, but uniform diametrally.

For the purpose of completely closing the inner oil reservoir, wear rings 55 are inserted into circumferential grooves 56 of the rotary member 5, these rings projecting into engagement with the lateral walls or webs of the reservoir and forming inner closure members for the same supplemented by the outer and lateral surface of the core 20.

Within the inner reservoir 12 means are provided for effecting the drive of the inner rotary member 20 from the flywheel, these means acting as suction and pressure exerting means relatively to the conduits 14 which terminate at said non-circular wall 13. The means for exerting this suction or pressure upon the fluid in the interior reservoir 12 thereby enforcing the circulation of the fluid through both of the reservoirs 1 and 12, and dependent on the volume of fluid in circulation, the rate of movement of the inner rotary member will vary more or less with respect to the rate of movement of the outer rotary member.

The means for exerting variable pressure and suction upon the fluids in the two reservoirs are formed in the present embodiment by peculiarly constructed valves 21 which are circumferentially spaced on and secured to the periphery of the inner rotary member 20 and which bridge the space between said inner rotary member and the non-circular wall surface of the reservoir, thereby dividing this inner space into a plurality of compartments 22, the volume of each of which varies upon relative rotation of the two members 5 and 20.

In the embodiment illustrated, these valves are shown as leaf springs 23 mounted on pintles 24 at their inner ends by means of which they are oscillatably secured in lugs 25 uniformly spaced about the core or rotary member 20. The outer edges of these resilient valve springs are arranged to remain in frictional contact with the non-circular wall 13 of the reservoir 12, and for the purpose of assuring this permanent contact, the outer ends also are provided with eyes 26 surrounding pintles 27 of a length exceeding the length of the edge of the leaf springs 23.

Rollers 28 at the projecting ends of the pintles 27 are adapted to travel in grooves 29 extending laterally into the rim portion of the flywheel at the non-circular walls 13. The frictional contact of the outer ends of these valve plates or leaf springs 23 with the circumferential wall of the interior reservoir 12 is, therefore, permanently maintained, and upon relative movement of flywheel 5 and core 20, these valves successively obstruct and free the ports 14 leading through the rim of the flywheel.

Upon this relative movement between flywheel and core being induced, a pumping action will, therefore, be exerted by these valve plates or partition walls, the volume of the individual compartments 22 being progressively increased and decreased again. When the ports 14 are unobstructed at their outer ends, a free circulation of the fluid is set up through the inner and outer reservoirs upon rotation of either member 5 or 20, and if it may be assumed that the flywheel 5 is rotated by being connected with the engine shaft 3, no rotation will be imparted to the core 20. The sole effect of this rotary movement of the flywheel 5 will be that of a pumping action for the fluid. Upon greater or less obstruction of these ports, however, the circulation of the fluid will be more or less impeded, whereby said fluid partly will act as a driving medium for the inner rotary member 20, and when the circulation of the fluid is entirely prevented, as for instance by complete closure of the outer ends of the ports 14, the rotation of the flywheel 5 will cause the non-compressible fluid in the inner reservoir to act as a driving medium upon the core to impart to the same, the same rotary speed which the flywheel 5 itself has.

For the purpose of controlling the speed of the inner or driven member 20 by partial or complete obstruction of the ports 14, means are provided which are accessible from the position of the operator, and which are embodied in the present invention by a slide 30 engaging and surrounding the flywheel 5 but being axially of a shorter length than this structure. Suitable means may be provided for preventing leakage of the fluid between said slide 30 and the outer surface of the rim of the flywheel, these means comprising for instance a ring 31 sprung into a groove 32 on the rim, and with which the inner surface of the slide 30 remains in contact.

The inner end of the rotary slide 30 also is provided with bevelled surfaces 33 adapted to engage corresponding bevelled surfaces 34 of a circular projection or stop 35 extending radially from the other portion of the flywheel. Upon displacement of the rotary slide 30 in axial direction, the ports 14, therefore, will be covered at their outer ends to a predetermined selective extent, and when the slide 30 has been shifted axially to come into contact with the seating surfaces 34 of the circumferential stop 35 of the other rim portion, the leakage of fluid from these ports is completely obviated.

The slide 30 is provided with one or more bores 36 each receiving a pin 37 which is fixedly held in position in the stop flange 35 by means of a head or nut 38 and which also carries an enlargement 39 at the other end. The pins 37 will cause, upon rotation of the flywheel 5 the slide 30 to rotate with the same, and they also limit the axial outward movement of the slide.

The axial displacement of the slide or control member 30 is effected in the embodiment shown by another ring 40 seated in a groove 41 of the slide 30, but being fixed against rotation. This ring 40 is movable axially of the entire transmission and enforces thereby when shifted also a shifting movement of the slide 30 in the predetermined desired direction, without interfering with the rotation of the slide.

By reference to Fig. 3 it will be noted that this ring 40 may be displaced by means of a rod 42 fixedly secured to the ring, and extending through the closure plate 18 of the casing 1 in which the entire transmission is disposed. Means are provided in the form of a suitable stuffing box 43 for preventing the leakage of the fluid through the guide opening for the rod. The outer end of this rod 42 is in pivotal connection with a lever 44 supported intermediate its ends upon a fulcrum bracket 45 secured to the outer face of the plate 18 of the casing and having its opposite end connected to an actuating bar 46 which is in communication in some suitable way, not illustrated, with the operative end of a shift lever 47. This lever may be arranged adjacent the operator's position so as to be readily actuated by the same, in the manner, for instance, in which this shift lever is arranged in gear shift cars.

This entire structure, including the rod 42 for shifting the ring 40, the lever 44 with its bracket 45 and the actuating bar 46 may be duplicated, as shown, to assure a uniform displacement of the shift ring. Owing to the shifting force acting on this ring 40 at several points, an axial sliding movement will take place without exerting any strains in oblique direction upon the ring 40 or slide 30 which closes and opens the ports of the flywheel.

In most instances it is desirable to actuate the rotary slide 30 only when a change of speed of the driven shaft is desired. In the normal operation of the transmission, the ports 14 will be closed to drive the core 20 at the same angular speed at which the engine shaft 3 is being rotated.

For the purpose of effecting under these normal conditions a positive drive of the rotary slide 30 together with the flywheel 5 and for relieving the strain upon the guiding pins 37 when the parts are in this normal driving position, means are provided for locking the slide 30 to the flywheel 5 at a predetermined position of the same, as for instance when closing position for the ports has been reached. The rotary slide 30 is for this purpose provided with one or more lugs 48 adapted to engage corresponding notches 49 in the rim of the flywheel structure. Upon the entry of the lugs 48 into these notches, it is obvious that the driving effect will be transmitted from the flywheel to the rotary slide 30 by means of these lugs, and at the same time the pins 37 which guide the slide for its axial movement will be relived from the driving effort.

When this position of the rotary slide 30 has been attained, the core 20 rotates at the same speed at which the flywheel 5 rotates, and a direct driving connection is, therefore, provided for interlocking the core 20 with a part fixedly associated with the flywheel. For this purpose a disc gear 50 is secured to the outer surface of the core, as by screws 51. The rotary slide 30 has a depending flange 53 provided with internal gear teeth 54 adapted to mesh with the teeth of the ring 50. It is obvious, therefore, that upon insertion of the control slide 30 to port obstructing position, at which the speed of the flywheel is transmitted directly to the core 20 and the shaft connected with the same, the engagement of the teeth 54 on the depending flange 53 with the teeth of the ring 50 secured to the core will lock the flywheel and core together, whereby independent of the hydraulic transmission a direct speed transmission from the driving to the driven member is attained.

The operation of the transmission will be clear from the above description. Assuming that the change speed gear transmission is for instance to be applied to an automobile, it will be apparent that the clutch for interrupting or establishing the connection between two sections of the driving shaft may be dispensed with. Upon the engine being started, the rotary slide 30 is left in full open position, the flywheel being rotated about the core which then remains stationary. This movement of the flywheel will merely set up a pumping action and cause the circulation of the fluid from the outer reservoir to the inner one, and from the inner to the outer reservoir, through the ports in the flywheel structure. When it is desired to start at low speed, the lever 47 is manipulated to cause the rotary slide 30 to obstruct partly the ports 14 and to interfere to a certain extent with the pumping action, so that the inner rotary member 20 will be rotated at a low speed, the larger portion of the fluid continuing its movement of circulation while the minor portion of the same will act as a driving medium for the core. The latter then travels with considerable slippage as compared with the flywheel. Upon further obstruction of the ports 14, the quantity of the fluid in circulation will be gradually decreased,—the major portion of the fluid then acting as a driving medium and thereby imparting a progressively increasing speed to the rotary member 20. When it is desired to travel at full speed, the rotary slide 30 is shifted to complete obstructing position for the ports, interfering thereby with the circulation of the fluid to such an extent that the non-compressible fluid within the inner reservoir, owing to the continuous variation of the volume of the compartments 22 will push the driven member at the same speed at which the flywheel is being rotated. In this position, furthermore, the strain on the guide pins 37 of the rotary slide 30 is completely released owing to the entry of the lugs 48 into the notches 49 of the flywheel; a positive driving engagement independent of the action of the non-compressible fluid is accomplished since the teeth 54 of the depending flange 53 on the rotary slide 30 then are in fixed mesh with the teeth of the gear ring 50 secured to the inner rotary member.

For the purpose of reversing the direction of rotation of the driven shaft a reversing mechanism 57 may be interposed in the driven line, to be operated by the lever 58 placed convenient to the operator and outside of the transmission.

As such mechanisms are old in the art and form no part of the invention in itself, further description is deemed unnecessary.

The operating parts of the control, the rod 42, lever 44 and actuating bar 46 may obviously be concealed within the casing 1 if desired, or by a suitable housing, not shown.

Anti-friction bearings 59 are utilized to support the inner end of the shaft 15.

I claim:

1. A hydraulic change speed transmission, comprising a flywheel, said flywheel being provided with a non-circular recess in the interior, said recess forming a fluid reservoir, a rotary member mounted concentrically with said flywheel and mounted for rotation independently thereof, means interposed between said flywheel and said rotary member for subdividing the interspace between the walls of said non-circular recess and said rotary member into a plurality of chambers of alternately increasing and decreasing volume, and providing for equal volume of diametrically opposite chambers the flywheel being provided with ports, an outer casing surrounding said flywheel and forming a fluid reservoir in communication with said ports, and means carried by and rotatable with said fly wheel for varying the effective cross-section of said ports.

2. A hydraulic change speed transmission, comprising a rotary driving member contained within a fluid reservoir, a rotary driven member concentric therewith and mounted for independent rotation relatively to said first named member, a fluid reservoir between said members, said fluid reservoir being confined by a non-circular wall formed on one of said members, partitions forming compartments within said fluid reservoir, and arranged to provide equal volume at diametrically opposite points, means operable by one of said rotary members for progressively varying the volumes of said compartments, one of said members being provided with conduits communicating with said first mentioned fluid reservoir, said means being adapted upon variation of the volumes of said compartments to vary the pressure of the fluid within the same and being adapted to set up circulation of the fluid through said conduits and reservoirs.

3. A hydraulic change speed transmission, comprising a flywheel having a fluid reservoir in its interior confined by a non-circular circumferential wall, said flywheel being provided with a plurality of radial ports, an outer fluid reservoir surrounding said flywheel and in communication with the inner reservoir through said ports, a substantially circular rotary member mounted concentric with said flywheel in said inner reservoir, oscillatable valves secured to the periphery of said inner rotary member and in frictional contact with the circumferential wall of the reservoir, said valves being adapted to be rocked about their points of support on the inner rotary member by the relative movement of the same with respect to the non-circular circumferential wall of the reservoir, and means for varying the effective cross-section of said ports.

4. A hydraulic change speed transmission, comprising a flywheel having a rim and having an inner fluid reservoir confined by an oval circumferential wall, a plurality of radial ports extending through the rim of the flywheel, a substantially circular member concentric with the flywheel and mounted for independent rotation with respect thereto in the interior of the flywheel, a plurality of valve plates oscillatably mounted on the periphery of said inner rotary member and in yielding engagement with the oval wall of said fluid reservoir, a casing forming an outer reservoir about said flywheel, and means for selectively varying the effective cross-section of the ports.

5. A hydraulic change speed transmission comprising a flywheel having an inner fluid reservoir confined by an oval circumferential wall, a substantially circular member concentric with said flywheel and said reservoir and mounted for independent rotation relatively thereto within said reservoir, the flywheel having a rim with a plurality of radial ports, a casing surrounding the flywheel and adapted to form an outer reservoir, spring valves connected with said inner rotary member and in permanent frictional engagement with said oval wall of the reservoir and adapted to rock about their connection with the inner member upon relative movement of said members, and means for selectively varying the effective cross-section of all of said ports uniformly.

6. A hydraulic change speed transmission, comprising a flywheel having an inner reservoir confined by a non-circular circumferential wall and ports extending from the outer circumference of said flywheel to said inner reservoir, an outer reservoir, a rotary member concentric with said flywheel and said reservoir and mounted for independent rotation within said inner reservoir, a plurality of leaf springs oscillatably secured to said inner rotary member, and adapted to engage said non-circular wall of the inner reservoir, means on said leaf springs and flywheel for permanently maintaining portions of said leaf springs in fluid tight engagement with the oval wall of said reservoir, and means for varying the effective area of said ports.

7. A hydraulic change speed transmission, comprising a flywheel having a fluid reservoir in its interior, said fluid reservoir being confined by a non-circular circumferential wall, the flywheel having a plurality of ports extending through said wall, an outer reservoir with which said ports communicate, a rotary member in the interior of and concentric with the flywheel within said inner reservoir, rockable valves between said flywheel and rotary member and operable upon relative movement of said flywheel and rotary member, common means carried by said fly wheel for varying the effective cross-section of said ports, and means for locking said port varying means to said flywheel upon adjustment of said port varying means to port closing position.

8. A hydraulic change speed transmission, comprising a flywheel having a rim and containing a fluid reservoir confined by a non-circular circumferential wall in its interior and having a plurality of ports extending into said wall and thru the rim of the flywheel, an outer reservoir with which said ports communicate, a substantially circular member centrally positioned within said inner reservoir, rockable valves between said flywheel and circular member and operable upon relative movement of said flywheel and member, a slide mounted on and rotatable with the rim of the flywheel and shiftable axially of the flywheel from port opening to port closing position, and means for limiting the movement of said slide in port closing direction.

9. A hydraulic change speed transmission, comprising a flywheel provided with a rim and contained within an outer fluid reservoir and provided with a fluid reservoir in its interior confined by a non-circular wall, the flywheel having ports through the rim communicating between said inner reservoir and said outer reservoir surrounding said flywheel, a substantially circular rotary member centrally positioned within the inner reservoir, rockable valves between said flywheel and inner member operable upon relative movement of said flywheel and member, a slide mounted on the rim of the flywheel and shiftable in axial direction, means for guiding said slide for axial movement relatively to the flywheel, and means for relieving said guiding means from strain when said slide has reached a predetermined position on said flywheel.

10. A hydraulic change speed transmission, comprising a flywheel contained within an outer fluid reservoir and having a fluid reservoir in its interior confined by a non-circular wall, the flywheel having a plurality of ports communicating between the inner reservoir and said outer reservoir surrounding said flywheel, a rotary substantially circular member centrally positioned and movably mounted within said reservoir, rockable valves interposed between said flywheel and rotary member and operable upon relative movement of said flywheel and member, a rotary slide mounted on said flywheel supported thereon to rotate with the same and to be axially shiftable thereon, and non-rotary means for effecting axial shifting movement of said slide from a remote position.

11. In a hydraulic change speed transmission, a case adapted to form an outer fluid reservoir, a drive shaft, a fly wheel rigidly secured to said shaft within said reservoir and provided with a rim, and arranged to provide an inner reservoir within said fly wheel, said inner reservoir having a non-circular circumferential wall arranged to preserve the symmetry of said fly wheel at diametrally opposite points, a circular member rotatably mounted in said inner reservoir, and positioned concentric with said fly wheel and to provide an inner space between said member and said wall of alternately increasing and decreasing volume, circumferentially, and providing for equal volume at pairs of diametrally opposite points, means rockably attached to said member for sub-dividing the inner space, ports contained in said rim and communicating with said outer and said inner reservoirs, said means being adapted upon variation of the volume of each sub-division to vary the pressure of the fluid within the same, and means mounted on and rotatable with said fly wheel to vary the cross section of said ports.

12. A hydraulic change speed transmission, comprising a rotary member having a fluid reservoir in its interior, another rotary member mounted in said fluid reservoir concentric with said first named rotary member, the interspace between said rotary members being non-uniform circumferentially and symmetrical at diametrally opposite points of said inner rotary member, an other reservoir, ports extending from the interspace between said rotary members to the outer reservoir, means operable upon relative movement of said rotary members for exerting a pumping action upon the fluid through said ports, and independent means for varying said pumping action.

13. A hydraulic change speed transmission comprising a flywheel contained within an outer fluid reservoir and having a fluid reservoir in its interior confined by a non-circular circumferential wall and having a rim having equal symmetry at diametral points and provided with a plurality of radial ports communicating between said inner reservoir and said outer reservoir, a rotary member in the inner reservoir concentric with the flywheel, rockable valves interposed between said rotary member and flywheel and adapted to remain yieldingly in frictional engagement with the circumferential wall of the reservoir, and a slide mounted on and rotatable with the flywheel and movable in axial direction to selectively vary the effective cross-section of said ports.

In testimony whereof I have affixed my signature.

JOSEPH E. BITTNER.